United States Patent
Basore

(10) Patent No.: US 11,946,552 B2
(45) Date of Patent: *Apr. 2, 2024

(54) RAPID DEPRESSURIZATION AND EXPLOSION PREVENTION SYSTEM FOR ELECTRICAL TRANSFORMERS

(71) Applicant: Sentry Global Solutions, Inc., Humble, TX (US)

(72) Inventor: Gerald D. Basore, Huffman, TX (US)

(73) Assignee: Sentry Global Solutions, Inc., Humble, TX (US)

( * ) Notice: Subject to any disclaimer, the term of this patent is extended or adjusted under 35 U.S.C. 154(b) by 1255 days.

This patent is subject to a terminal disclaimer.

(21) Appl. No.: 16/522,348

(22) Filed: Jul. 25, 2019

(65) Prior Publication Data

US 2020/0032919 A1 Jan. 30, 2020

Related U.S. Application Data

(60) Provisional application No. 62/703,997, filed on Jul. 27, 2018, provisional application No. 62/703,544, filed on Jul. 26, 2018.

(51) Int. Cl.
| | |
|---|---|
| *F16K 17/16* | (2006.01) |
| *F16K 27/12* | (2006.01) |
| *H01F 27/12* | (2006.01) |
| *H01F 27/24* | (2006.01) |
| *H01F 27/28* | (2006.01) |

(52) U.S. Cl.
CPC ............. *F16K 17/16* (2013.01); *F16K 27/12* (2013.01); *H01F 27/12* (2013.01); *H01F 27/24* (2013.01); *H01F 27/28* (2013.01)

(58) Field of Classification Search
CPC .......... H01F 27/12; H01F 27/24; H01F 27/28; F16K 17/16; F16K 27/12
See application file for complete search history.

(56) References Cited

U.S. PATENT DOCUMENTS

| | | | | |
|---|---|---|---|---|
| 4,085,764 | A | * | 4/1978 | Raidl, Jr. ............ F16K 17/1613 137/68.28 |
| 4,444,214 | A | * | 4/1984 | Paul, Jr. .............. F16K 17/1606 137/454.2 |
| 5,012,945 | A | * | 5/1991 | Keenan ................... F16K 17/16 137/71 |

(Continued)

*Primary Examiner* — P. Macade Nichols
(74) *Attorney, Agent, or Firm* — Haynes and Boone, LLP

(57) ABSTRACT

An electrical transformer system includes an electrical transformer and a depressurization system in fluid communication with an outlet of the electrical transformer. The depressurization system may include a rupture disk housing assembly, a rupture disk cartridge, and a removable cover. The housing assembly may include a container having an opening and cavity to receive the cartridge and first and second flanges to connect to duct piping of the transformer. The removable cover may enclose the opening of the housing assembly. The cartridge may include a rupture disk secured between first and second disk support plates. The cartridge may be pre-assembled outside the housing assembly. The cartridge may be removed from and/or installed in the housing assembly through the opening. The rupture disk may be inspected, serviced, and/or replaced without disconnecting the housing assembly from the duct piping.

20 Claims, 7 Drawing Sheets

(56) References Cited

U.S. PATENT DOCUMENTS

| | | | |
|---|---|---|---|
| 5,191,990 A * | 3/1993 | Fritts | F17C 13/12 |
| | | | 220/88.1 |
| 6,804,092 B1 | 10/2004 | Magnier | |
| 7,317,598 B2 | 1/2008 | Magnier | |
| 9,816,633 B2 | 11/2017 | Kendrick | |
| 10,811,180 B1 * | 10/2020 | Basore | H01F 27/14 |

* cited by examiner

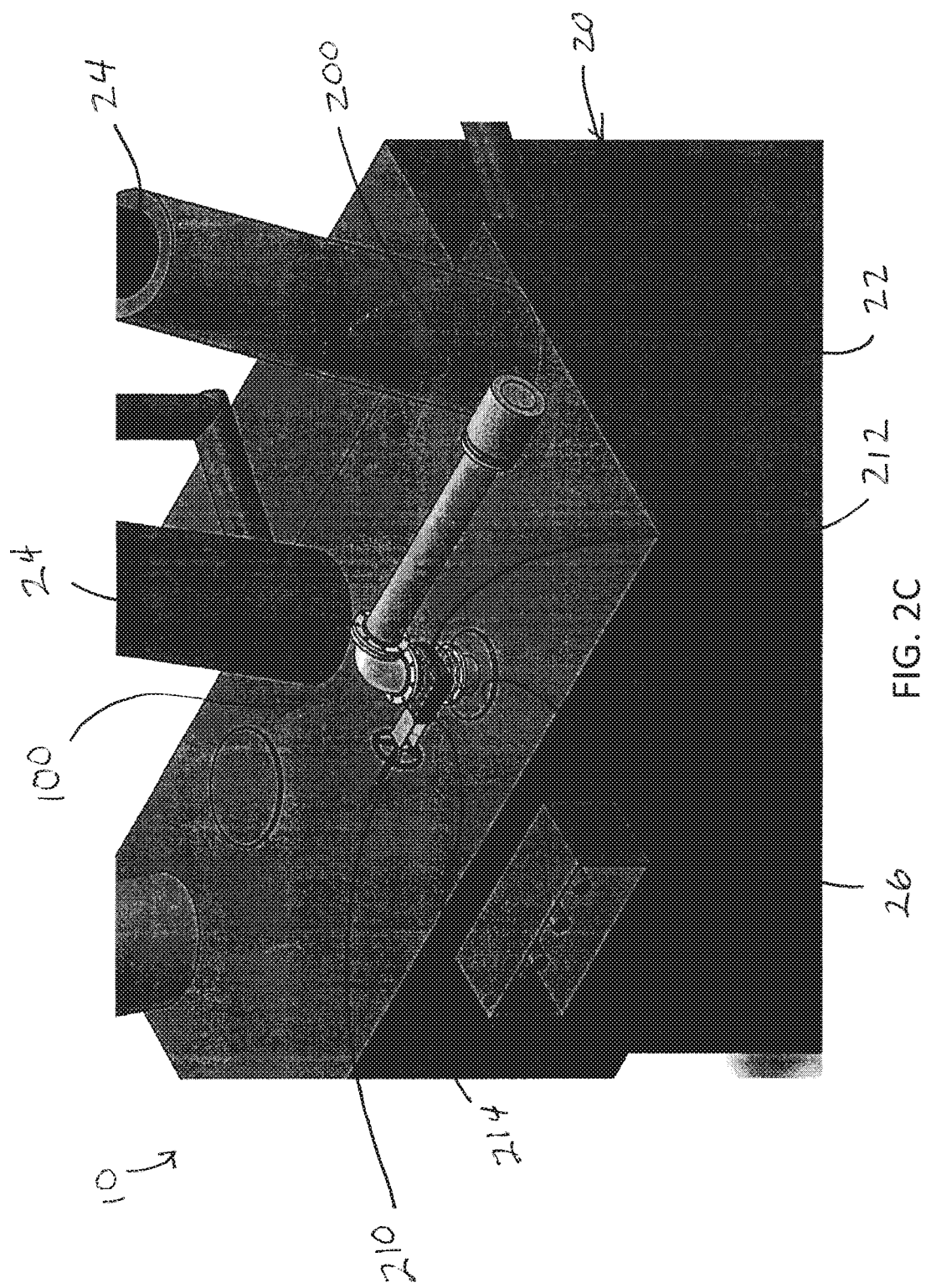

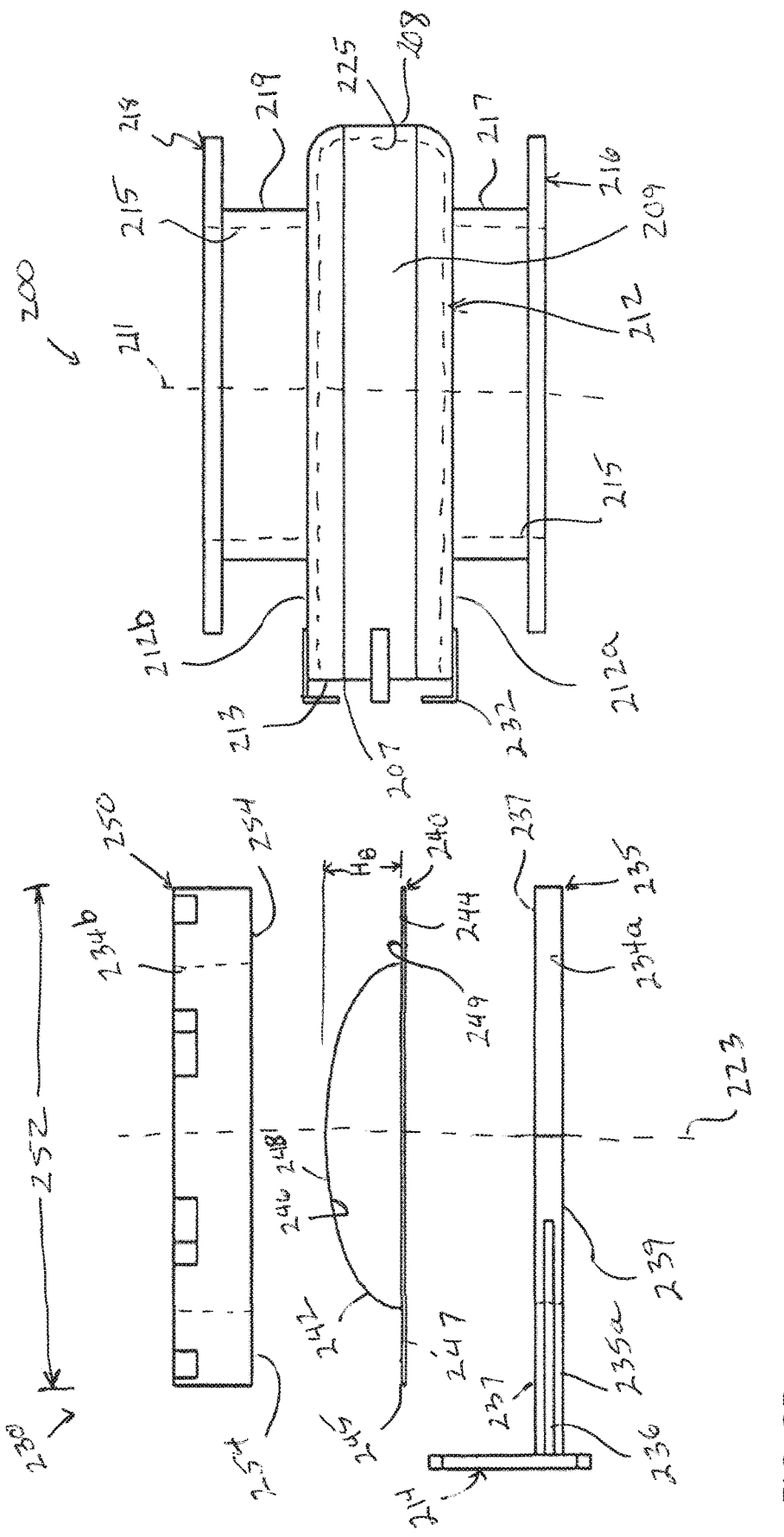

RAPID DEPRESSURIZATION AND EXPLOSION PREVENTION SYSTEM FOR ELECTRICAL TRANSFORMERS

CROSS-REFERENCE TO RELATED APPLICATION

This application claims the benefit of U.S. provisional patent application Ser. No. 62/703,997 filed Jul. 27, 2018 and entitled "Rapid Depressurization and Explosion Prevention System for Electrical Transformers" and U.S. provisional patent application Ser. No. 62/703,544 filed Jul. 26, 2018 and entitled "Explosion Vent Holder."

BACKGROUND

Electrical transformers are commonly found as components within a power grid used for either "stepping up" or "stepping down" voltage of an alternating current to allow for more efficient transportation of electrical power within the power grid. Transformers alter the voltage of the alternating current flowing through it by inductively coupling two conductors housed within the transformer. Specifically, both of the conductors include coils that are individually wound about a core (e.g., a silicon steel core having high magnetic flux permeability), where each coil includes a specific number of turns or windings and the change in voltage of the current flowing through the two inductively coupled conductors is proportional to the ratio of turns of the coil for each conductor.

Due to the high amount of current flowing through the two conductors of the transformer significant heat is generated internally by the transformer and thus, each conductor's coil is housed within a sealed chamber containing a coolant to prevent damaging critical components of the transformer, such as the insulation covering the individual windings for each conductor. For instance, transformers often include oil, such as mineral oil, within the sealed chamber to provide cooling to the inductively coupled conductors. In this arrangement, oil may be circulated from the chamber and through a heat exchanger to cool the oil, so it may be recirculated back into the sealed chamber to further cool the conductors. Because the oil used in cooling the conductors is often flammable, an ignition source (i.e., a spark) within the sealed chamber may ignite the oil, causing the oil to rapidly heat and expand as it vaporizes, resulting in a rapid increase in the pressure of fluid within the chamber.

For this reason, some transformers include a pressure relief valve (PRV) coupled to the chamber and configured to open in the event of an overpressurization of the chamber so as to reduce fluid pressure within the sealed chamber by releasing fluid from the chamber and to, for example, the surrounding environment. For instance, PRVs often include a spring having a stiffness corresponding to the amount of absolute pressure at which the PRV is meant to actuate. However, a period of time exists between the overpressurization event (i.e., spark and subsequent ignition) and the complete actuation of the PRV, which is sometimes referred to as the "response time" of the PRV.

Other transformer systems include a depressurization fluid circuit coupled to the transformer that contains a domed burst disk that is configured to burst or rupture when exposed to a predetermined differential pressure across the upstream and downstream faces of the disk. In such systems, the domed burst disk has a domed, segmented circular shape which is convex on the downstream side of the disk and is intended to be fitted to an outlet orifice of a transformer. At the base of the dome is a circular retention portion formed of a thin metal sheet, which retention portion is clamped between two opposing circular flanges forming a retention assembly that is bolted in-line along duct piping. Such burst disks commonly require regular replacement to ensure that the disks have not degraded during deployment. Whether a disk is being swapped during maintenance, or in the event a disk has burst due to overpressurization, replacement of the disk requires that the duct piping be broken down by disassembling the flanges from the duct piping and from one another, replacing the disk, reassembling the flanges and then bolting the retention assembly back in line along the duct piping, all of which is time consuming and cumbersome.

BRIEF DESCRIPTION OF THE DRAWINGS

For a detailed description of exemplary embodiments, reference will now be made to the accompanying drawings in which:

FIG. 2C is a close-up perspective view of a portion of the depressurization system of FIG. 1A;

FIG. 3B is a side elevation view of the rupture disk housing assembly of FIG. 3A;

FIG. 3D is an exploded side elevation view of a rupture disk cartridge in accordance with the teachings herein;

DETAILED DESCRIPTION

Figure 1B:
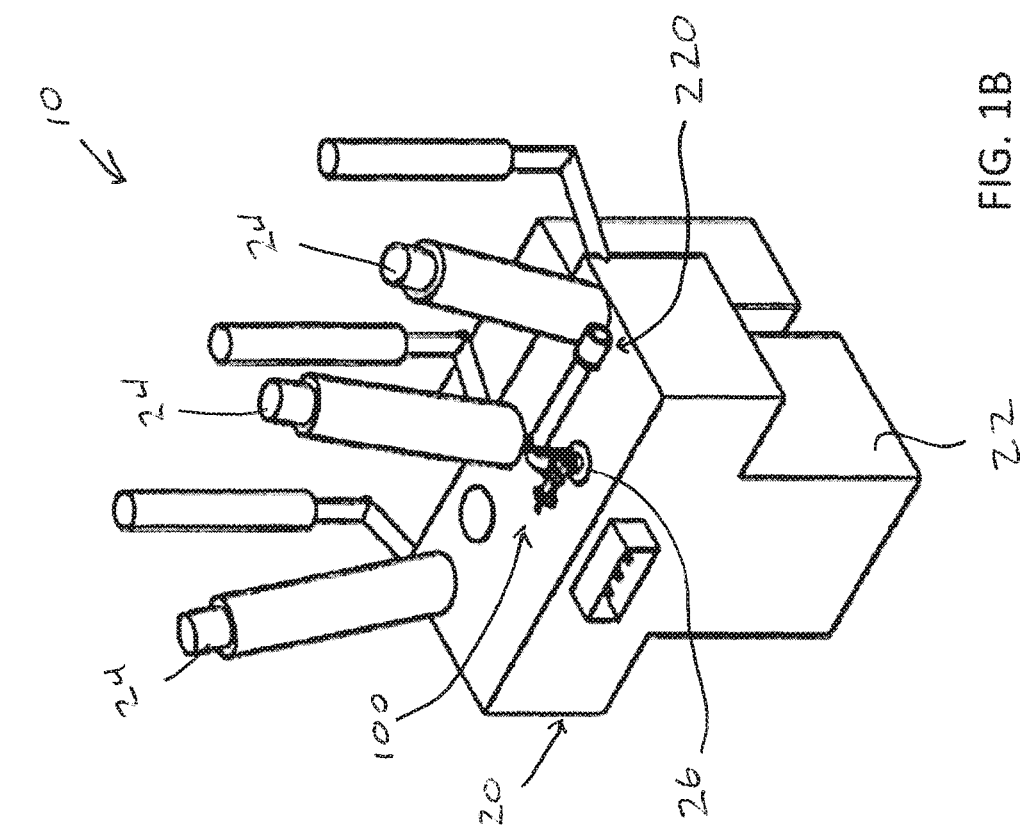
FIG. 1B is a perspective view of the depressurization system of FIG. 1A.

In the drawings and description that follow, like parts are typically marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line" or the like refers to any fluid transmission means. The various characteristics mentioned above, as well as other features and characteristics described in more detail below, will be readily apparent to those skilled in the art upon reading the following detailed description of the embodiments, and by referring to the accompanying drawings.

The embodiments described herein include a depressurization system configured for use with an electrical transformer. Herein is presented various combinations of components and principles which provide for the ability to rapidly relieve fluid pressure within a fluid filled chamber of an electrical transformer, so as to reduce the risk of overpressurizing the chamber. Particularly, embodiments of the depressurization system include a rupture disk housing assembly deployed in-line along duct piping, where the housing assembly includes a removable cover and is disposed to receive a rupture disk cartridge that can readily be replaced without the need to disassemble the duct piping.

Figure 1A:
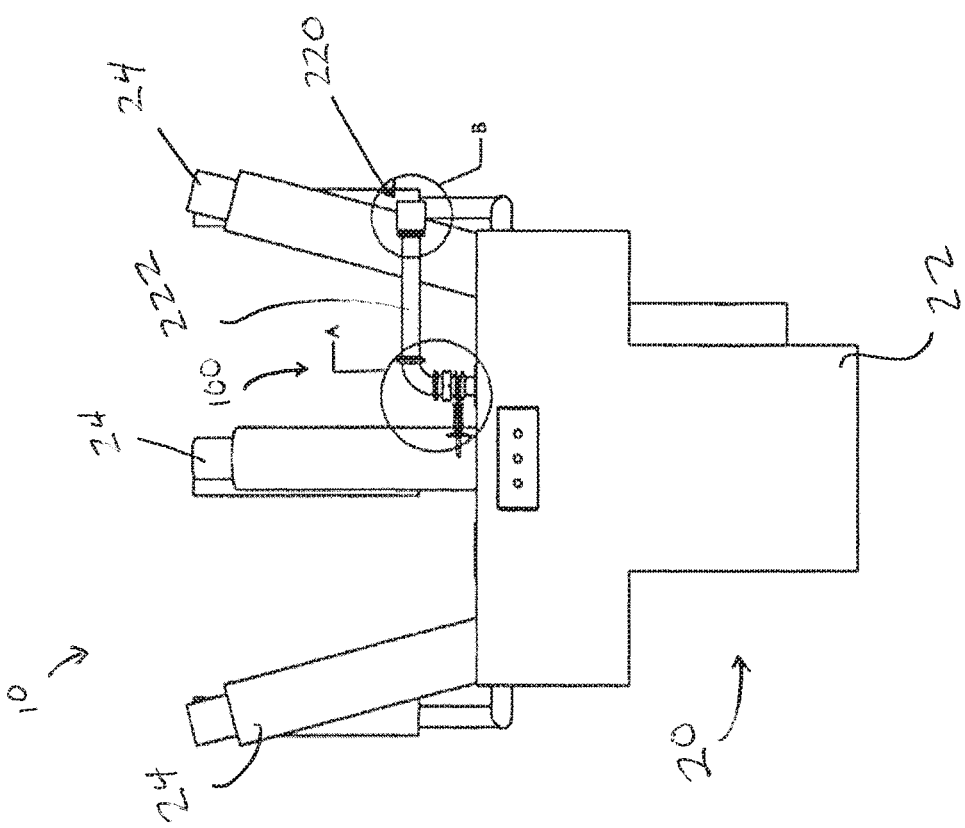
FIG. 1A is a front elevation view of an electrical transformer system in accordance with the teachings herein.

Referring initially to FIGS. 1A-1B, an electrical transformer system 10 is shown that includes an electrical transformer 20 having an embodiment of a depressurization system (DS) 100 coupled thereto. The transformer 20 includes a sealed chamber 22, electrical cables 24 and DS 100. Sealed chamber 22 includes a magnetic core (not shown) and electrical conductors (not shown) disposed in a coolant (not shown) as is generally understood in the art. In the illustrated embodiment of transformer 20, the coolant contained within chamber 22 is mineral oil. However, in other embodiments chamber 22 may include other forms of coolant. In some embodiments, chamber 22 contains more than 1,000 gal of coolant. It will be appreciated that DS 100 may be utilized with any transformer and the above description transformer 20 is for illustrative purposes only.

During operation, a high amount of alternating current flows through electrical cables 24 to the conductors housed within chamber 22, generating and transferring heat to the coolant disposed therein. Sealed chamber 22 also includes a manhole 26, which includes an opening (not shown) that is configured to provide for fluid communication between chamber 22 and DS 100. Thus, fluid pressure contained within chamber 22 may be communicated to DS 100 via manhole 26. During the operation of transformer 20, an ignition event, such as a spark, may take place within chamber 22, which may result in the combustion of at least a portion of the coolant within chamber 22, rapidly elevating the fluid pressure within chamber 22 and communicated to DS 100.

Figure 2B:
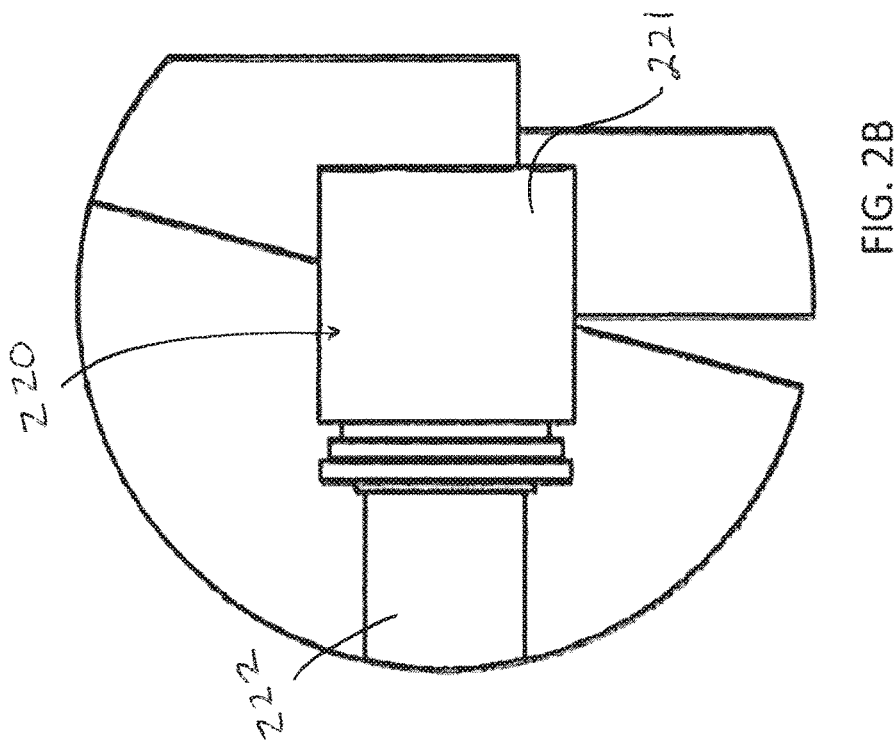
FIG. 2B is a side elevation view of an outlet of the depressurization system denoted by line B in FIG. 1A.
Figure 2A:
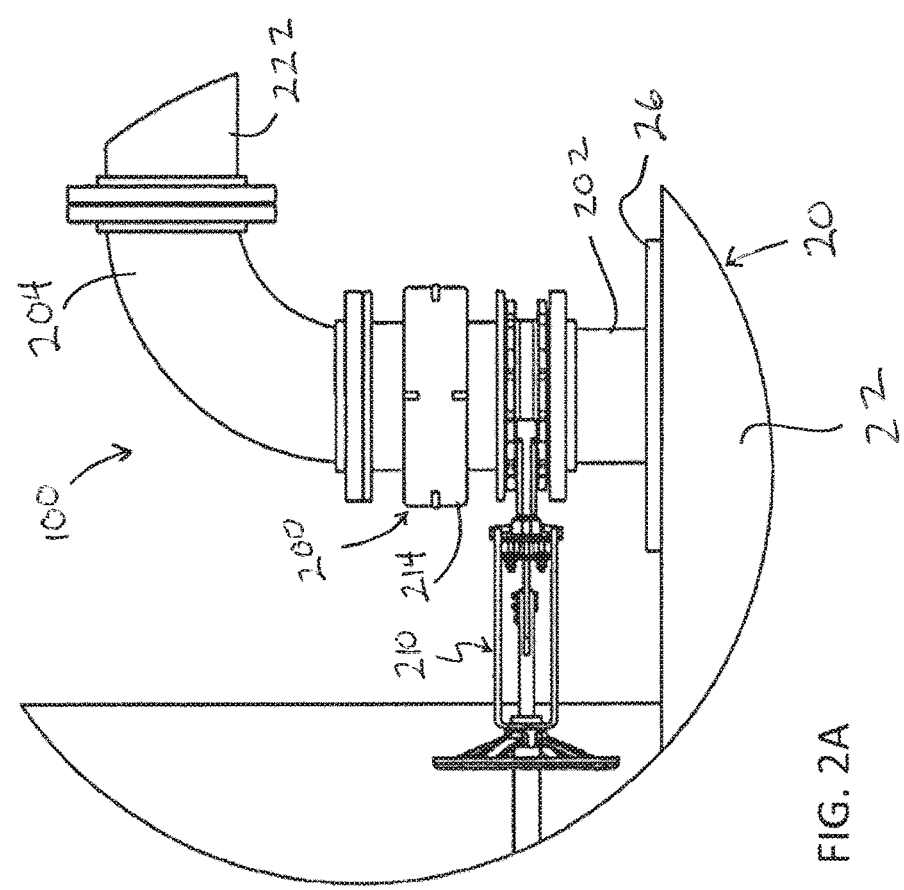
FIG. 2A is a side elevation view of a depressurization system denoted by line A in FIG. 1A.
Figure 3A:
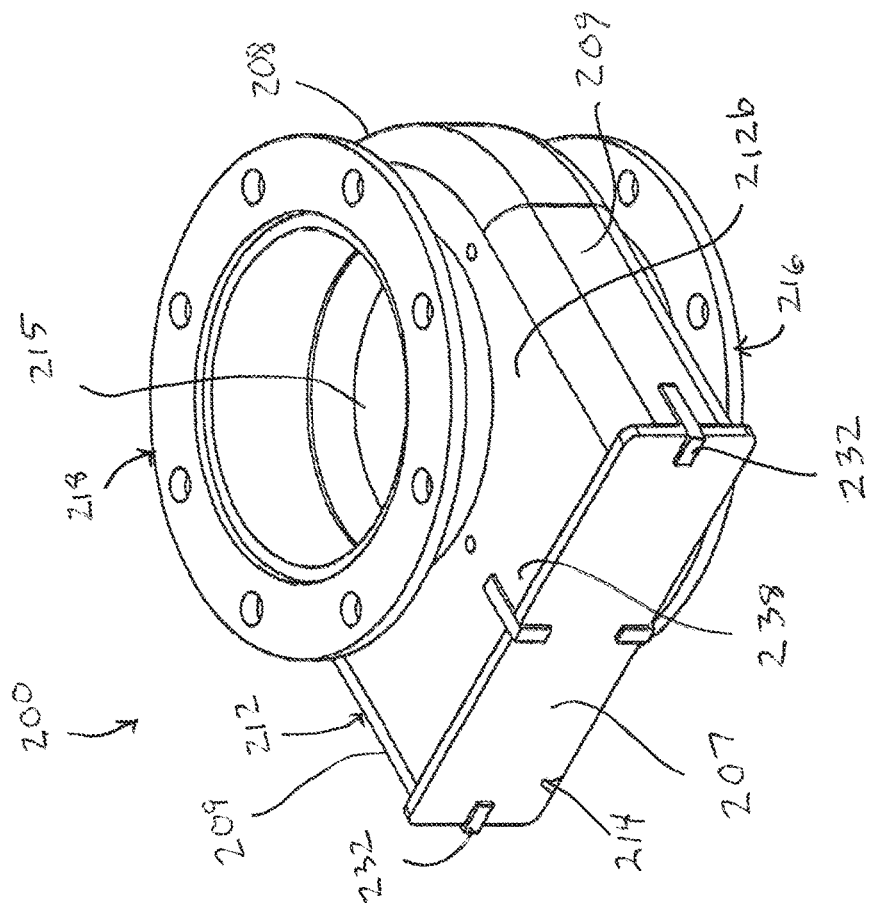
FIG. 3A is a perspective view of a rupture disk housing assembly in accordance with the teachings herein.
Figure 3C:
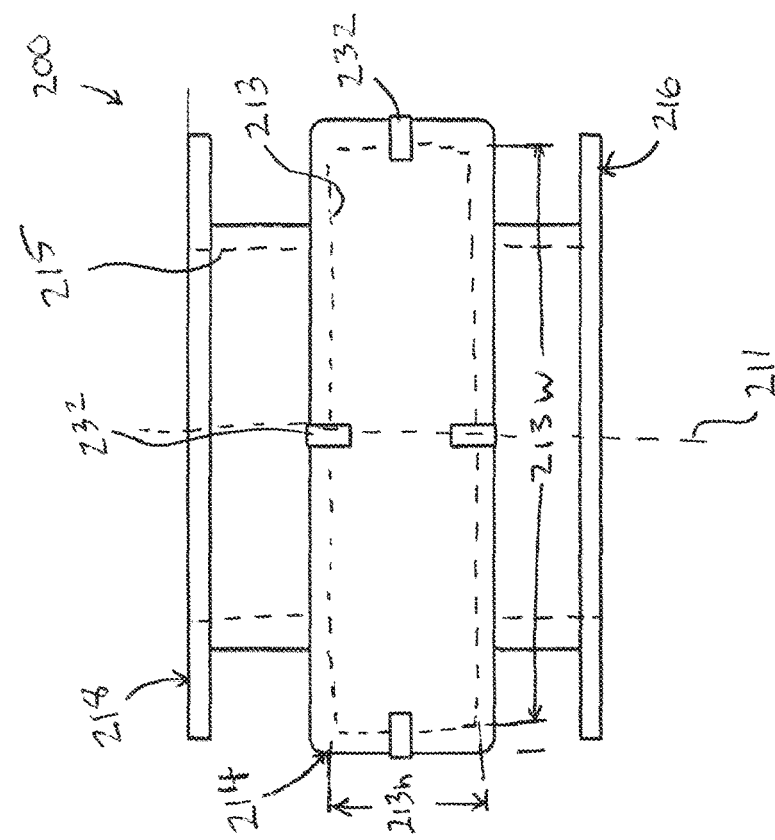
FIG. 3C is a front elevation view of the rupture disk housing assembly of FIG. 3A.

Referring now to FIGS. 2A-2C, in this embodiment DS 100 is shown in more detail attached to transformer 20. In particular, DS 100 includes an explosion vent or rupture disk housing assembly 200 coupled in-line along a first pipe portion 202 and a second pipe portion 204. In one or more embodiments, as illustrated, first pipe portion 202 may be a riser and second pipe portion 204 may be an elbow or another riser. In one or more embodiments, an additional valve 210 may be provided along first pipe portion 202 between transformer 20 and DS 100. Although not limited to a particular type of valve, in the illustrated embodiment, valve 210 is shown as a gate valve, more particularly a knife gate valve, which, it will be appreciated, can be closed in order to isolate DS 100 from fluid flow along first pipe portion 202, such as would be desired when performing maintenance on DS 100.

With reference to FIGS. 3A-3D and on-going reference to FIGS. 2A-2C, housing assembly 200 generally includes a container 212 to which a removable cover 214 is secured. Container 212 includes an opening 213 enclosed by removable cover 214. Opening 213 has a height 213h and a width 213w and extends into an internal cavity 225 formed within container 212. Housing assembly 200 further includes a first or lower flange 216, and a second or upper flange 218. In one or more embodiments, first flange 216 is disposed for attachment to first pipe section 202 (see FIG. 2A) and second flange 218 is disposed for attachment to second pipe section 204 (see FIG. 2A). A through bore 215 is formed through housing assembly 200 generally about housing axis 211, first flange 216, and second flange 218 for communicating fluid flow between first pipe portion 202 and second pipe portion 204. In the illustrated embodiment, first flange 216 connects to a first surface 212a of container 212 via first housing riser 217 and second flange 218 connects to a second surface 212b of container 212 via second housing riser 219. In one or more embodiments, housing assembly 200 has a low profile selected to correspond generally with the approximate height $H_B$ of a burst disk 240 to be inserted into container 212. Thus, container 212, and specifically, internal cavity 225, is sized in shape and dimension to receive a cartridge 230 as described in more detail below.

In one or more embodiments, electrical transformer system 10 may include a substantially horizontal, elongated pipe 222 coupled to second pipe section 204. Elongated pipe 222 may function as an expansion reservoir for sealed chamber 22 when an ignition event occurs that results in rupture of burst disk 240, allowing liquid from sealed chamber 22 to temporarily flow into elongated pipe 222 via housing assembly 200. In some embodiments, while elongated pipe 222 is substantially horizontal, it may have a slight incline from the horizon so that any liquid that temporarily expands into elongated pipe 222 will thereafter drain back into sealed chamber 22. In one or more embodiments, the incline is between 1 degree and 15 degrees with the horizontal.

Figure 4:
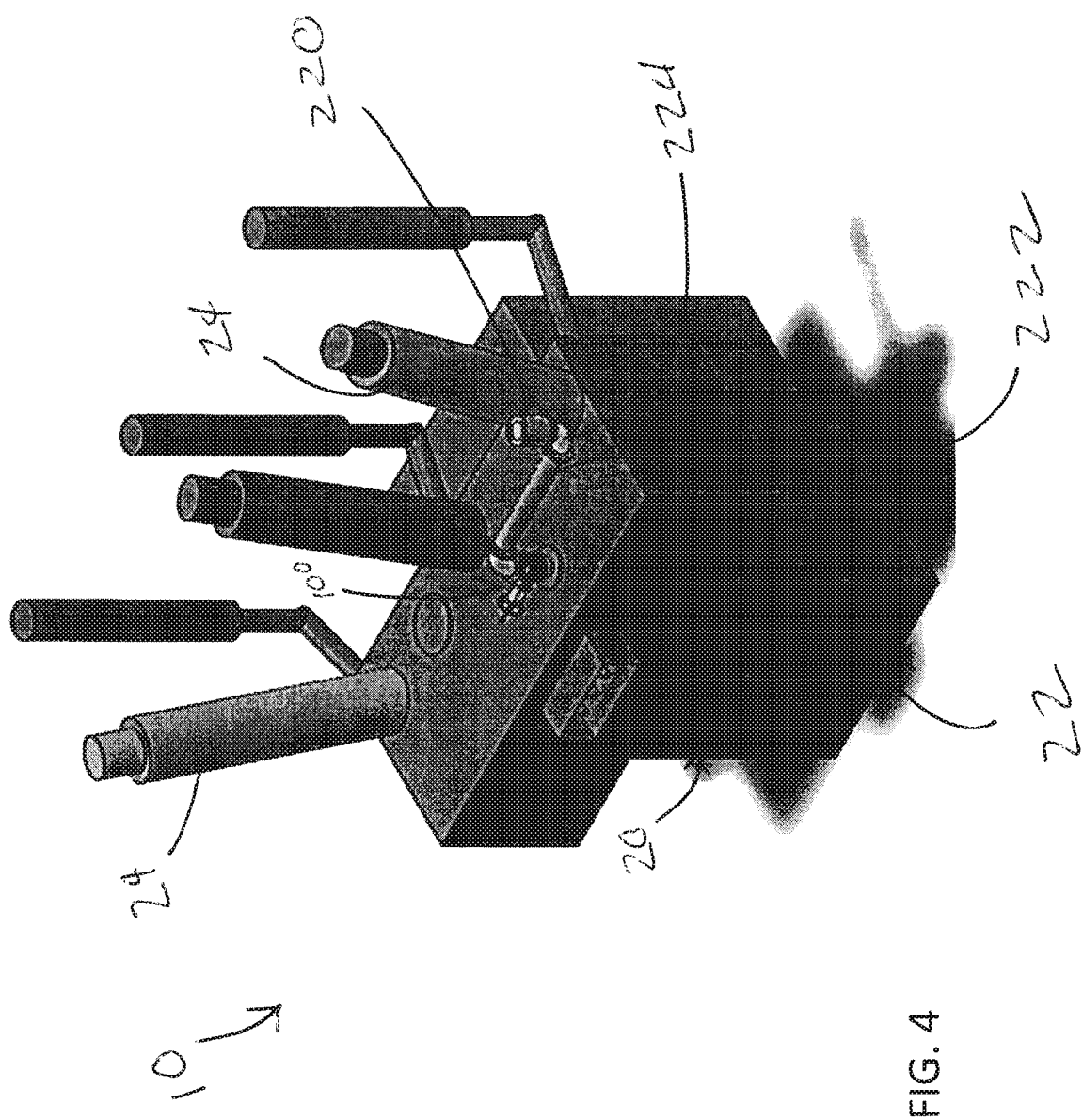
FIG. 4 is a perspective view of an electrical transformer system in accordance with the teachings herein.

As will be appreciated, accompanying any liquid that might flow into elongated pipe 222 may be ignition gasses. Thus, a flame suppressor 220 may be disposed at the end of elongated pipe 222. In one or more embodiments, flame suppressor 220 may be aligned with pipe 222 and each is oriented substantially horizontally so that an outlet therefrom faces sideways. In other embodiments, such as is illustrated in FIG. 4, flame suppressor 220 may have a different orientation. The disclosure is not limited to a particular orientation of flame suppressor 220.

In the above described embodiments, pipe 222 is selected to be sufficiently long to temporarily receive oil (not shown) from transformer 20 during an overpressurization event. As stated, in some embodiments, pipe 222 may be constructed on a slight between the two ends of pipe 222 with the lower end coupled to second pipe section 204 so as to be inclined toward housing assembly 200 to allow oil to drain back into transformer 20 after the overpressurization event. In one or more embodiments, transformer 20 is in a building, or other structure, and pipe 222 passes to an outside of the building, or other structure, before connecting to flame suppressor 220. In one or more embodiments, electrical transformer system 10 includes an oil collection tank (not shown) connected to pipe 222 at a T-junction allowing oil to collect via gravity into the oil collection tank while gas is routed to flame suppressor 220. In the illustrated embodiment, burning gases may also travel along elongated pipe 222 and be released from the end of elongated pipe 222 into flame suppressor 220. Flame suppressor 220 is not limited to a particular type but may be any device that functions to suppress flames that may accompany the release of gases from elongated pipe 222. In one or more embodiments, flame suppressor 220 may include a screen 221. In some embodiments, screen 221 may be selected to prevent any particles larger than 50 microns from passing through screen 221. Pipe 222 may include, without limitation, braided stainless steel pipe with standard ANSI Class 150 flanges, as it will be appreciated that braided pipe can make installation easier and reduces installation time compared to conventional pipes.

Turning more specifically to FIGS. 3A-3D, depressurization system 100 is shown in more detail and includes rupture disk housing assembly 200 and rupture disk cartridge 230. In the illustrated embodiment, cartridge 230 includes a base 239, a first disk support plate 235, a rupture disk 240, and a second disk support plate 250, with the rupture disk 240 secured between the first and second support plates 235, 250, respectively. In one or more embodiments, base 239 and first support plate 235 may be integrally formed, while in other embodiments, first support plate 235 may be separate from base 239 but supported by base 239. Each support plate 235, 250 includes a bore 234a, 234b, respectively, formed therein along cartridge axis 223 of rupture disk cartridge 230. One or both support plates 235, 250 may be a circular ring. In some embodiments, first disk support plate 235 forms base 239 and second disk support plate 250 is a circular ring. It will be appreciated that when disk cartridge 230 is seated in disk housing assembly 200 as described herein, cartridge axis 223 and housing axis 211 substantially align so that bore 215 of housing assembly 200 and bores 234a, 234b of disk cartridge 230 are likewise aligned as described herein. In one or more embodiments, first plate 235 may include splines 236 along one or both sides 235a thereof for engagement with complementing grooves (not shown) on internal sidewalls of container 212 for leveling rupture disk cartridge 230 during insertion into disk housing assembly 200. However, it will be appreciated that other structures may be used to facilitate insertion of first plate 235 and/or cartridge 230 into container 212.

In one or more embodiments, as illustrated, removable cover 214 may be attached to first plate 235, while in other embodiments, removable cover 214 may be separate from first plate 235. In the illustrated embodiment, fasteners 232 may be utilized to secure removable cover 214 to container 212. In one or more embodiments, fasteners 232 may be housing weldments attached to the outside surface 238 of container 212 about opening 213 to secure rupture disk cartridge 230 within housing assembly 200 by extending over removable cover 214 preventing removal thereof. In any event, removable cover 214 functions to enclose opening 213 of container 212 and prevent removal of cartridge 230 therefrom. In the illustrated embodiment, four fasteners 232 are shown. However, it will be appreciated that any number of housing fasteners 232 may be used. Moreover, while housing weldments are illustrated, it will be appreciated that fasteners 232 may include, without limitation, pins, bolts, screws, clamps or other devices.

As described above, in one or more embodiments, container 212 has a low-profile shape with a height to width ratio substantially the same as the height to width ratio ($213h$:$213w$) of opening 213 where the width $213w$ is greater than the height $213h$. In some embodiments, the width $213w$ is greater than twice the height $213h$, while in other embodiments, the width $213w$ is equal to or greater than four times the height $213h$. In one or more embodiments, container 212 has a front side 207 in which opening 213 is formed, an opposing back side 208 with side walls 209 extending between front side 207 and back side 208. In one or more embodiments, front side 207 is substantially flat and back side 208 is semicircular. In one or more embodiments, back side 208 is semicircular around housing axis 211.

Cartridge 230 includes a rupture disk 240 disposed adjacent first plate 235. Although not limited to a particular type of rupture disk, in the illustrated embodiment, rupture disk 240 has an upward facing domed portion 242 which is spherical in shape and which is concave on an upstream side 246 and convex on a downstream side 248. Rupture disk 240 has a retention portion 244 surrounding the domed portion 242. Each of domed portion 242 and retention portion 244 may have a circular shape about axis 223. When disposed between first disk support plate 235 and second disk support plate 250, retention portion 244 is engaged by first plate 235 and second plate 250 so that domed portion 242 extends into the bore 234b of second disk support plate 250. In some embodiments, first plate 235 may have a recess (not shown) disposed in surface 237 thereof that complements a perimeter shape 245 of retention portion 244 for aligning rupture disk 240 about axis 223. In any event, first plate 235 attaches to second plate 250 so as to clasp retention portion 244 therebetween.

Rupture disk 240 is not limited to a particular material. In one or more embodiments, rupture disk may be formed of a material exhibiting at least the following properties: adequate chemical resistance to vapors present below rupture disk 240 during normal operation, rupture disk 240 being exposed to such vapors over a long lifespan; adequate ductility to perforate or tear without fragmenting so that pressure is relieved therethrough without sending fragments downstream; and adequate strength to resist pressures below failure pressure. Example materials for rupture disk 240 may include, without limitation, stainless steel, stainless steel 316L, carbon steel, and metal alloys. Example post-fabrication treatments for rupture disk 240 may include, without limitation, annealing and surface coating to alter one of chemical and mechanical properties thereof. In some embodiments, materials of domed portion 242 and retention portion 244 are the same. However, in other embodiments, materials of domed portion 242 and retention portion 244 may differ in one or more of composition and chemical and mechanical properties thereof.

In one or more embodiments, each of first plate 235 and second plate 250 include a sealing face on a respective top surface 237 or bottom surface 254 thereof. Retention portion 244 includes sealing faces on a bottom surface 247 and top surface 249 thereof complementing each of the respective sealing faces of first plate 235 and second plate 250. In one or more embodiments, sealing between each of first plate 235, second plate 250, and rupture disk 240 includes metal to metal seals. In other embodiments, each sealing face of first plate 235 and second plate 250 may have a recess therein to accept a gasket or o-ring for sealing to retention portion 244 of rupture disk 240. In other embodiments, the sealing faces of retention portion 244 may have a recess therein for accepting a gasket or o-ring complementing respective flat sealing faces on each of the top and bottom surfaces of first plate 235 and second plate 250. In some embodiments, first plate 235 and second plate 250 may seal with respective lower and upper surfaces of container 212 using various sealing structures as described above. Similarly, in one or more embodiments, such seals as described above may be provided between cover 214 and container 212.

Cartridge 230 is shown as having a second plate 250 disposed over the rupture disk 240. Second plate 250 has a bore 234b therethrough for aligning second plate 250 within cartridge 230 and within housing assembly 200 when cartridge 230 is installed therein. The bore 234b of second plate 250 is sized to surround domed portion 242 of rupture disk 240 such that at least part of domed portion 242 is disposed within the bore thereof when cartridge 230 is assembled. In the illustrated embodiment, second plate 250 has a flat bottom face 254 for sealing with retention portion 244. In one or more embodiments, second plate 250 has an outer diameter 252 sized to fit within a structural envelop or footprint of first plate 235. Cartridge 230 may be pre-assembled with first plate 235, rupture disk 240, and second plate 250 prior to inserting cartridge 230 into container 212. Pre-assembled cartridge 230 has a cartridge height and a cartridge diameter. The cartridge height depends on individual heights of first plate 235, retention portion 244, and second plate 250. The cartridge diameter may correspond to an outer diameter 252 of second plate 250, which may further correspond to an outer diameter of rupture disk 240 and/or cartridge 230. In any case, the cartridge height and cartridge diameter are less than or equal to height 213h and width 213w of opening 213, respectively, allowing cartridge 230 to be inserted therein. In one or more embodiments, cartridge 230 is assembled by first stacking first plate 235, rupture disk 240, and second plate 250. In one or more embodiments, cartridge 230 is assembled by fastening second plate 250 to first plate 235. In other embodiments cartridge 230 may be press fit or friction fit within container 212 to compress rupture disk 240 between first plate 235 and second plate 250 ensuring contact between sealing faces thereof. In other embodiments, first plate 235, rupture disk 240, and second plate 250 may be inserted into container 212 separately, and in some embodiments, one of first plate 235 and second plate 250 may be omitted. After insertion, housing fasteners 232 are secured into place as described earlier.

In one or more embodiments, base 239 may be similarly shaped to container 212. Thus, a front side to which plate 214 attaches may be substantially flat, while an opposing back side is semicircular in shape.

Referring now to FIG. 4, another embodiment of electrical transformer system 10 is illustrated. In this embodiment, flame suppressor 220 is connected to elongated pipe 222 via a 90-degree elbow 224. In such embodiments, flame suppressor 220 is oriented vertically so that an outlet therefrom faces upward.

Figure 5:
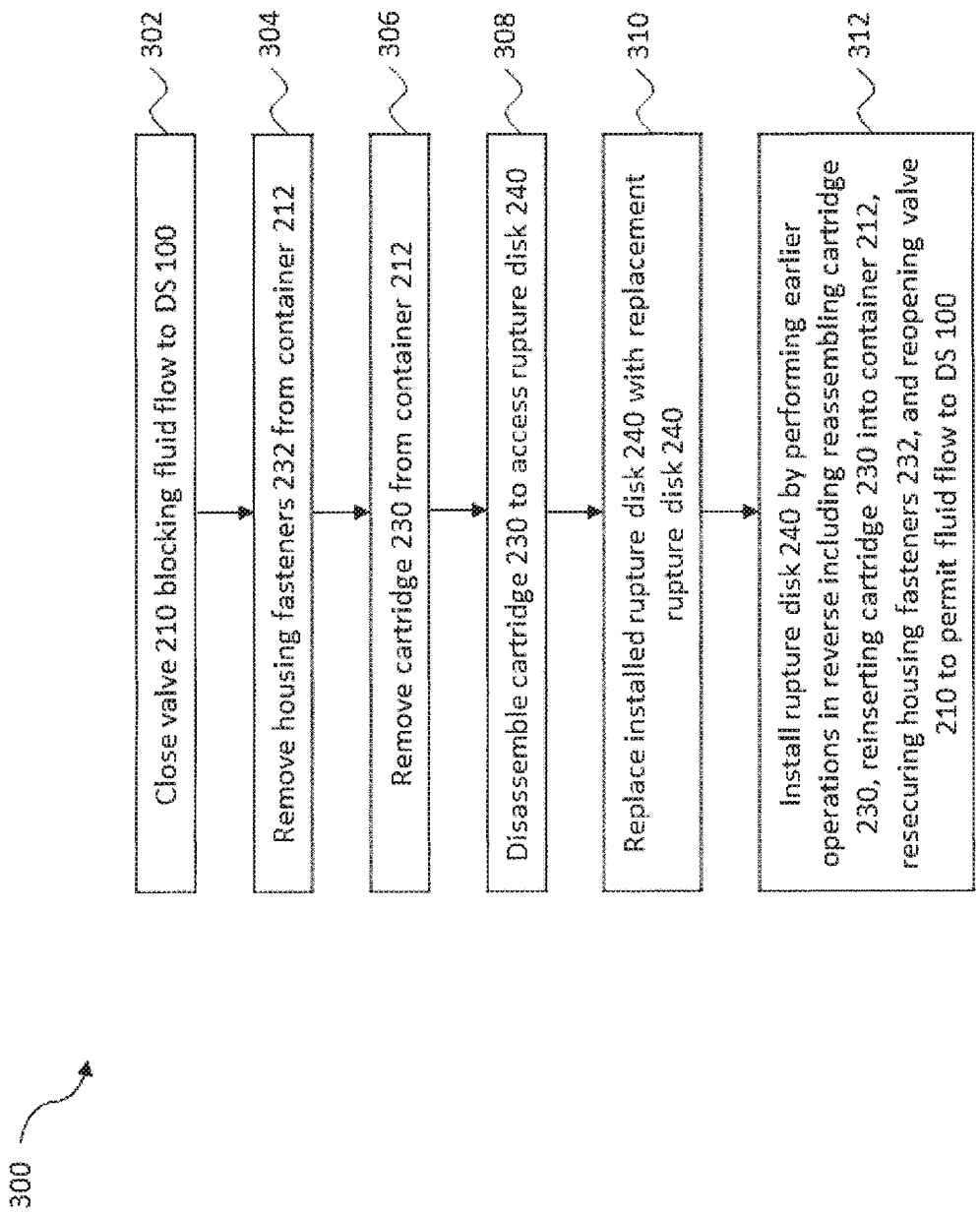
FIG. 5 is a flowchart outlining a method of servicing a depressurization system in accordance with the teachings herein.

Turning to FIG. 5, a method 300 of servicing rupture disk 240 is illustrated. More particularly, method 300 describes replacing a rupture disk 240. At operation 302, valve 210 is closed to isolate DS 100 from fluid flow along first pipe portion 202. At operation 304, housing fasteners 232 are removed from container 212. At operation 306, cartridge 230 is removed from container 212. At operation 308, cartridge 230 is disassembled by removing second plate 250 from cartridge 230, thereby allowing access to rupture disk 240. In this regard, second plate 250 may be disassembled from first plate 235. At operation 310, installed rupture disk 240 is replaced with a replacement rupture disk 240. At operation 312, replacement rupture disk 240 is installed by performing operations for removing the installed rupture disk 240 in reverse, namely, cartridge 230 is reassembled by securing replacement rupture disk between first plate 235 and second plate 250, cartridge 230 is reinserted into container 212, fasteners 232 are resecured, and valve 210 is reopened. In other embodiments of the above described process, valve 210 need not be opened or closed as described.

In one or embodiments, rupture disk 240 includes a burst disk sensor (not shown) to indicate to a PLC or controller of a control system that rupture disk 240 has burst. Use of cartridge 230 to hold rupture disk 240 has several advantages. First, if rupture disk 240 bursts, then installed rupture disk 240 can be replaced with replacement rupture disk 240 by following method 300 without disassembling housing assembly 200 from first and second pipe sections 202, 204 such as in conventional installations. Second, if rupture disk 240 requires inspection to determine whether rupture disk 240 needs replacement, rupture disk 240 can be readily removed for visual inspection by following operations 302, 304, 306, and 308 without disassembling housing assembly 200 from first and second pipe sections 202, 204. After visual inspection, rupture disk 240 can be reinstalled by following operation 312. Third, if rupture disk 240 has a burst disk sensor, the sensor can be inspected, serviced, and/or replaced by following operations 302, 304, 306, and 308 without disassembling housing assembly 200 from first and second pipe sections 202, 204. After inspection, service and/or replacement, rupture disk 240 can be reinstalled by following operation 312.

Embodiments have been described in terms of rapidly relieving fluid pressure within a main fluid filled tank of electrical transformer system 10, so as to reduce the risk of overpressurization. However, it will be appreciated that embodiments can be used for other components of electrical transformer system 10, including without limitation bushing turrets, on load tap changers, and oil filled cable boxes.

Thus, a depressurization system for an electrical transformer has been described. The depressurization system may include a rupture disk housing assembly having a container with an opening, a first flange attached to the container, a second flange attached to the container; a rupture disk cartridge comprising a rupture disk secured between a first disk support plate and a second disk support plate, wherein the rupture disk cartridge is disposed within the container; and a removable cover enclosing the opening. Likewise, a transformer system has been described. The transformer system may include an electrical transformer having a chamber in which a magnetic core and electrical conductors are disposed in a coolant, the chamber having an outlet defined therein; and a depressurization system in fluid communication with the outlet of the electrical transformer, where the depressurization system may include a rupture disk housing assembly having a container with an opening, a first flange attached to the container, a second flange attached to the container; a rupture disk cartridge comprising a rupture disk secured between a first disk support plate and a second disk support plate, wherein the rupture disk cartridge is disposed within the container; and a removable cover enclosing the opening.

For any one of the foregoing embodiments, the following elements may be combined alone or in combination with other elements:

The removable cover forms part of the rupture disk cartridge.

The removable cover is attached to the first disk support plate.

The rupture disk cartridge is pre-assembled outside the rupture disk housing assembly.

The opening has a first height and a first width, wherein the first height is at least equal to a height of the rupture disk cartridge, wherein the first width is at least equal to a diameter of the rupture disk cartridge.

The rupture disk comprises a domed portion and a retention portion.

The first disk support plate and the second disk support plate form metal to metal seals with the rupture disk retention portion.

The transformer system of claim 8, wherein the first flange connects to a first pipe section upstream of the depressurization system and the second flange connects to a second pipe section downstream of the depressurization system, wherein the rupture disk cartridge is removable from the rupture disk housing assembly without disconnecting either of the first flange from the first pipe section or the second flange from the second pipe section.

The removable cover forms part of the rupture disk cartridge.

A valve configured to block fluid communication between the electrical transformer and the depressurization system.

A flame suppressor disposed downstream of the depressurization system.

The flame suppressor is oriented substantially horizontally.

The electrical transformer and the depressurization system are disposed inside a structure, wherein the flame suppressor is disposed outside the structure.

The first disk support plate comprises a base and the second disk support plate comprises a circular ring.

The second disk support plate is a ring disposed about an axis with a bore formed through the ring.

The first disk support plate is a ring disposed about an axis with a bore formed through the ring.

Each disk support plate includes a bore formed therein.

The container is low profile with a container width that is at least twice a height of the container.

The rupture disk is formed about an axis and comprises an upward facing domed portion which is spherical in shape about the axis and a substantially flat retention portion surrounding the domed portion.

The second disk support plate engages the rupture disk so that the domed portion extends into a bore formed through the second disk support plate.

The retention portion is clasped between the first disk support plate and the second disk support plate so that the axis of the rupture disk aligns with the axis of each bore.

An internal cavity formed within the container.

A through bore formed through housing about a housing axis.

The container is low profile.

The container has a front side in which the opening is formed, an opposing back side and side walls extending between front side and back side.

The front side is substantially flat and the back side is semicircular.

The cartridge base has a front side that is substantially flat and an opposing back side that is semicircular in shape.

A substantially horizontal, elongated expansion pipe extending between a first end and a second end with the first end in fluid communication with the rupture disk housing.

A substantially horizontal flame suppressor attached to elongated expansion pipe at the second end.

At least a portion of elongated expansion pipe between the two ends forms an angle with the horizontal that is greater than zero and less than 15 degrees.

A substantially vertical flame suppressor attached to elongated expansion pipe at the second end.

Thus, a method of servicing a depressurization system for an electrical transformer has been described. The method includes closing a valve to block fluid communication between the depressurization system and the electrical transformer; removing a removable cover from an opening of a rupture disk housing assembly; and removing a rupture disk cartridge from the rupture disk housing assembly through the opening to expose a rupture disk carried by the rupture disk cartridge.

For embodiments of the foregoing method, the following steps may be included, alone or in combination with any other steps:

Where the rupture disk has burst, replacing the burst rupture disk with a replacement rupture disk.

Disassembling the rupture disk cartridge to access a rupture disk disposed in the rupture disk cartridge.

Inspecting the rupture disk to determine whether the rupture disk needs replacement.

Installing the rupture disk cartridge into the rupture disk housing assembly.

Assembling the rupture disk cartridge outside the rupture disk housing assembly prior to installing the rupture disk cartridge into the rupture disk housing assembly.

Thus, it is seen that the apparatus of the present invention readily achieves the ends and advantages mentioned as well as those inherent therein. While certain preferred embodiments of the present invention have been illustrated for the purposes of this disclosure, numerous changes in the arrangement and construction of parts may be made by those skilled in the art, which changes are encompassed within the scope and spirit of the present invention as defined by the appended claims.

The invention claimed is:

1. A depressurization system for an electrical transformer, the electrical transformer having a chamber in which a magnetic core and electrical conductors are disposed in a coolant, the chamber having an outlet defined therein; a depressurization system in fluid communication with the outlet of the electrical transformer the depressurization system comprising:

a rupture disk housing assembly having a container formed about a housing axis, the container having a front side parallel to the housing axis and spaced apart from the housing axis, with an opening formed in the front side, a first flange attached to the container and disposed about the housing axis, a second flange attached to the container and disposed about the housing axis with a through bore extending along the housing axis between the first flange and the second flange;

a rupture disk cartridge removably insertable into the rupture disk housing through the opening, wherein the rupture disk cartridge is disposed within the container; and a rupture disk carried by the rupture disk cartridge.

2. The depressurization system of claim 1, wherein the rupture disk cartridge comprises a removable cover.

3. The depressurization system of claim 1, wherein rupture disk cartridge comprises a first disk support plate supporting the rupture disk.

4. The depressurization system of claim 1, further comprising a valve attached to one of the flanges.

5. The depressurization system of claim 1, wherein the rupture disk has a height and diameter and the opening has a first height and a first width, wherein the first height of the opening is greater than the height of the rupture disk, wherein the first width of the opening is greater than the diameter of the rupture disk.

6. The depressurization system of claim 1, wherein the rupture disk comprises a domed portion and a retention portion.

7. The depressurization system of claim 6, wherein the rupture disk cartridge comprises a first disk support plate and a second disk support plate engaging the retention portion of the rupture disk therebetween so as to form metal to metal seals with the rupture disk.

8. A transformer system comprising:
an electrical transformer having a chamber in which a magnetic core and electrical conductors are disposed in a coolant, the chamber having an outlet defined therein;
a depressurization system in fluid communication with the outlet of the electrical transformer, the depressurization system comprising:
a rupture disk housing assembly having a container with an opening, a first flange attached to the container, a second flange attached to the container;
a rupture disk removably insertable into the rupture disk housing through the opening;
a removable cover enclosing the opening; and
a valve disposed between the outlet of the electrical transformer and the rupture disk housing.

9. The transformer system of claim 8, wherein the first flange connects to a first pipe section upstream of the depressurization system and the second flange connects to a second pipe section downstream of the depressurization system, wherein the rupture disk is removable from the rupture disk housing assembly without disconnecting either of the first flange from the first pipe section or the second flange from the second pipe section.

10. The transformer system of claim 8, further comprising a rupture disk cartridge supporting the rupture disk within the housing.

11. The transformer system of claim 9 wherein the valve is in fluid communication with the first pipe section.

12. The transformer system of claim 8 further comprising a flame suppressor disposed downstream of the rupture disk housing.

13. The transformer system of claim 12, wherein the flame suppressor is oriented substantially horizontally.

14. The transformer system of claim 12, wherein the electrical transformer and the depressurization system are disposed inside a structure, wherein the flame suppressor is disposed outside the structure.

15. A method of servicing a depressurization system for an electrical transformer, wherein the depressurization system includes a pipe section extending from an electrical transformer, comprising:
removing a removable cover from an opening of a rupture disk housing assembly disposed along a pipe section;
removing the rupture disk cartridge from the rupture disk housing assembly through the opening by extracting the rupture disk cartridge orthogonally relative to the pipe section to expose a rupture disk carried by the rupture disk cartridge;
removing a rupture disk from the rupture disk cartridge;
replacing the rupture disk removed from the rupture disk cartridge with a replacement rupture disk; and
inserting the rupture disk cartridge with the replacement rupture disk orthogonally relative to the pipe section into the rupture disk housing assembly.

16. The method of claim 15, further comprising, prior to removing the removable cover, closing a valve to block fluid communication between the depressurization system and the electrical transformer.

17. The method of claim 15 further comprising disassembling the rupture disk cartridge to access a rupture disk carried by the rupture disk cartridge.

18. The method of claim 17 further comprising inspecting the rupture disk to determine whether the rupture disk needs replacement.

19. The method of claim 15 further comprising replacing the removable cover once the rupture disk cartridge has been inserted into the rupture disk housing assembly.

20. The method of claim 16 further comprising replacing the removable cover once the rupture disk cartridge has been inserted into the rupture disk housing assembly and thereafter opening the valve to allow fluid communication between the depressurization system and the electrical transformer.

* * * * *